(12) United States Patent
Danisch

(10) Patent No.: US 9,777,568 B2
(45) Date of Patent: Oct. 3, 2017

(54) BIPARTITE SENSOR ARRAY

(71) Applicant: 059312 N.B. INC, Fredericton (CA)

(72) Inventor: Lee Allen Danisch, New Market (CA)

(73) Assignee: 059312 N.B. Inc., Fredricton (CA)

( * ) Notice: Subject to any disclaimer, the term of this patent is extended or adjusted under 35 U.S.C. 154(b) by 132 days.

(21) Appl. No.: 14/888,607

(22) PCT Filed: May 1, 2014

(86) PCT No.: PCT/CA2014/050417
§ 371 (c)(1),
(2) Date: Nov. 2, 2015

(87) PCT Pub. No.: WO2014/176699
PCT Pub. Date: Nov. 6, 2014

(65) Prior Publication Data
US 2016/0076359 A1      Mar. 17, 2016

(30) Foreign Application Priority Data

May 2, 2013 (CA) ...................... 2815195

(51) Int. Cl.
*G01C 15/00* (2006.01)
*E21B 47/022* (2012.01)
(Continued)

(52) U.S. Cl.
CPC .............. *E21B 47/022* (2013.01); *E02D 1/00* (2013.01); *E02D 29/10* (2013.01); *E02D 31/00* (2013.01); *G01C 9/06* (2013.01); *G01C 15/00* (2013.01)

(58) Field of Classification Search
CPC ........................................................ G01C 15/00
(Continued)

(56) References Cited

U.S. PATENT DOCUMENTS

| 4,399,692 A | 8/1983 | Hulsing, II et al. |
| 5,311,953 A | 5/1994 | Walker |

(Continued)

FOREIGN PATENT DOCUMENTS

| EP | 2527538 A1 | 11/2012 |
| JP | H05187858 A | 7/1993 |

OTHER PUBLICATIONS

International Search Report dated Jul. 22, 2014 from corresponding International Patent Application No. PCT/CA2014/050417; 3 pgs.

(Continued)

*Primary Examiner* — G. Bradley Bennett
(74) *Attorney, Agent, or Firm* — Maier & Maier, PLLC

(57) ABSTRACT

A bipartite sensor array comprising two portions capable of assembly into a single sensory system. A first portion includes rigid bodies connected by elongate flexures and fitted with gravimetric tilt sensors. The elongate flexures are capable of non-monotonic and non-constant bend in two degrees of freedom. A second portion includes rigid bodies connected by joints, contains the first portion. The second portion, which may be delivered and assembled separately from the first, provides rigidity and protection, enabling the first portion to have short rigid bodies and long connecting flexures, thereby reducing the number of sensors required. The bipartite sensor array is applicable to geotechnical measurements of soil and civil structures.

11 Claims, 8 Drawing Sheets

(51) Int. Cl.
*E02D 31/00* (2006.01)
*G01C 9/06* (2006.01)
*E02D 1/00* (2006.01)
*E02D 29/00* (2006.01)

(58) Field of Classification Search
USPC .................................. 33/302, 303, 304, 313
See application file for complete search history.

(56) References Cited

U.S. PATENT DOCUMENTS

| 6,127,672 | A | 10/2000 | Danisch | |
|---|---|---|---|---|
| 6,659,200 | B1* | 12/2003 | Eppink | E21B 4/18 166/381 |
| 7,296,363 | B2 | 11/2007 | Danisch | |
| 7,584,808 | B2* | 9/2009 | Dolgin | E21B 47/022 175/45 |
| 8,899,351 | B2* | 12/2014 | Hay | E21B 4/02 175/107 |
| 2003/0233759 | A1* | 12/2003 | Taylor | E21B 47/022 33/304 |
| 2008/0294343 | A1* | 11/2008 | Sugiura | E21B 47/022 702/6 |
| 2009/0281686 | A1 | 11/2009 | Smith et al. | |
| 2010/0096186 | A1* | 4/2010 | Ekseth | E21B 7/067 175/45 |
| 2013/0091716 | A1* | 4/2013 | DiFoggio | G01C 17/00 33/301 |
| 2014/0138157 | A1* | 5/2014 | Heisig | E21B 7/064 175/40 |
| 2015/0053485 | A1* | 2/2015 | Altimas | E21B 4/02 175/41 |
| 2015/0354280 | A1* | 12/2015 | Downton | E21B 4/02 175/107 |
| 2016/0123134 | A1* | 5/2016 | Viens | E21B 7/04 175/45 |

OTHER PUBLICATIONS

Extended European Search Report (EESR) dated Dec. 6, 2016, including a Supplementary European Search Report and the European Search Opinion, in connection with corresponding EP Application No. 14791413.9 (9 pgs.).

Claude E. Shannon, "Communication in the Presence of Noise", in Proceedings of the IEEE, vol. 86, No. 2, Feb. 1998, pp. 447-457 (11 pgs.).

* cited by examiner

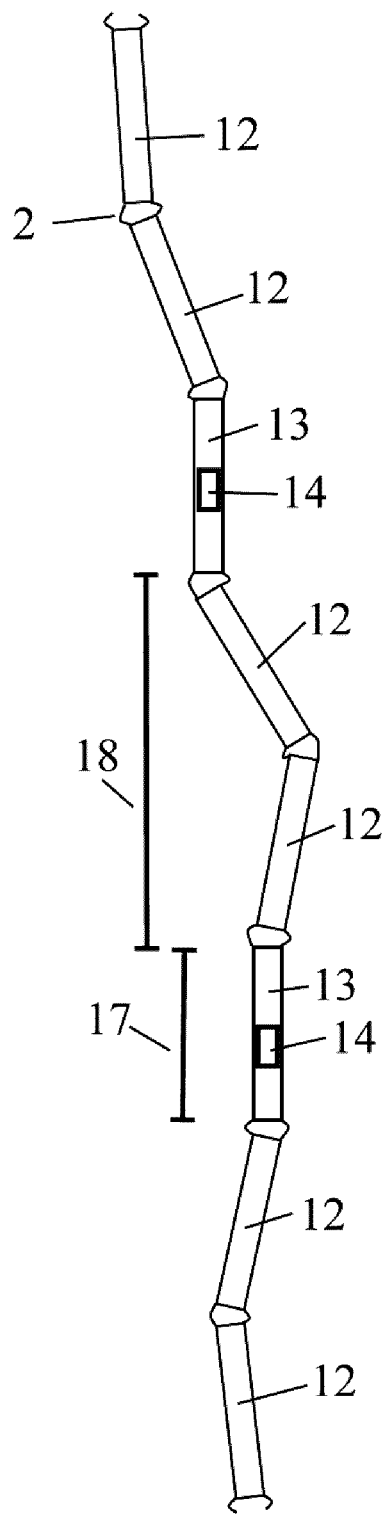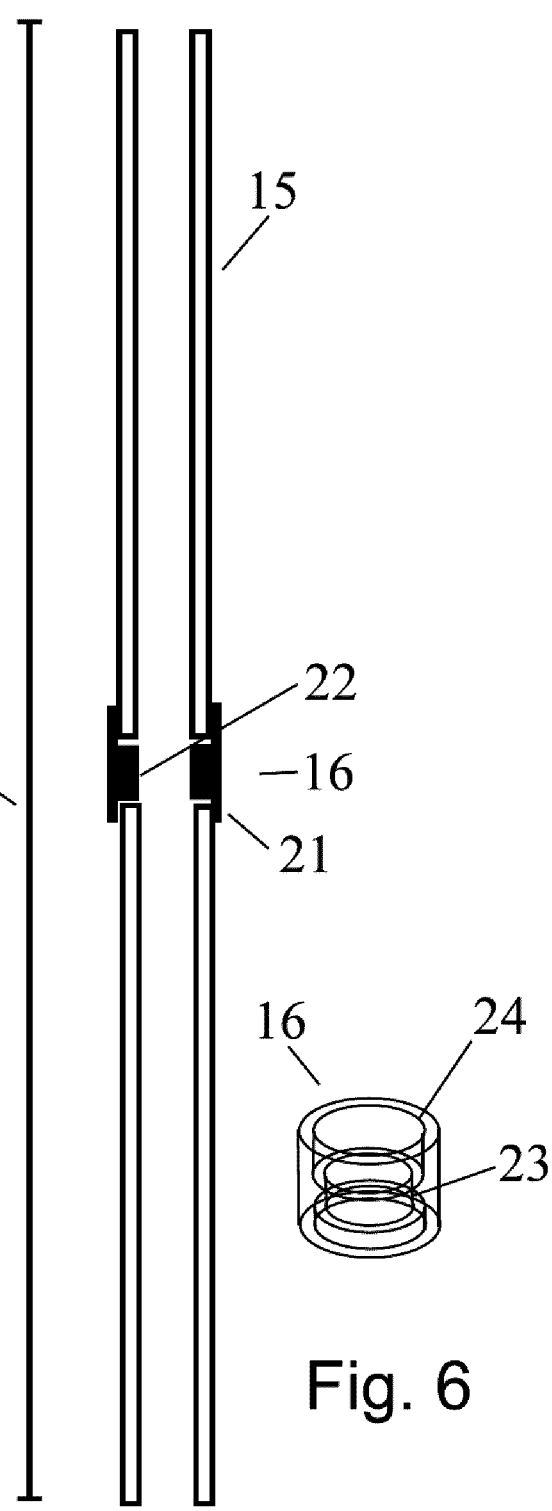
Fig. 4    Fig. 5    Fig. 6

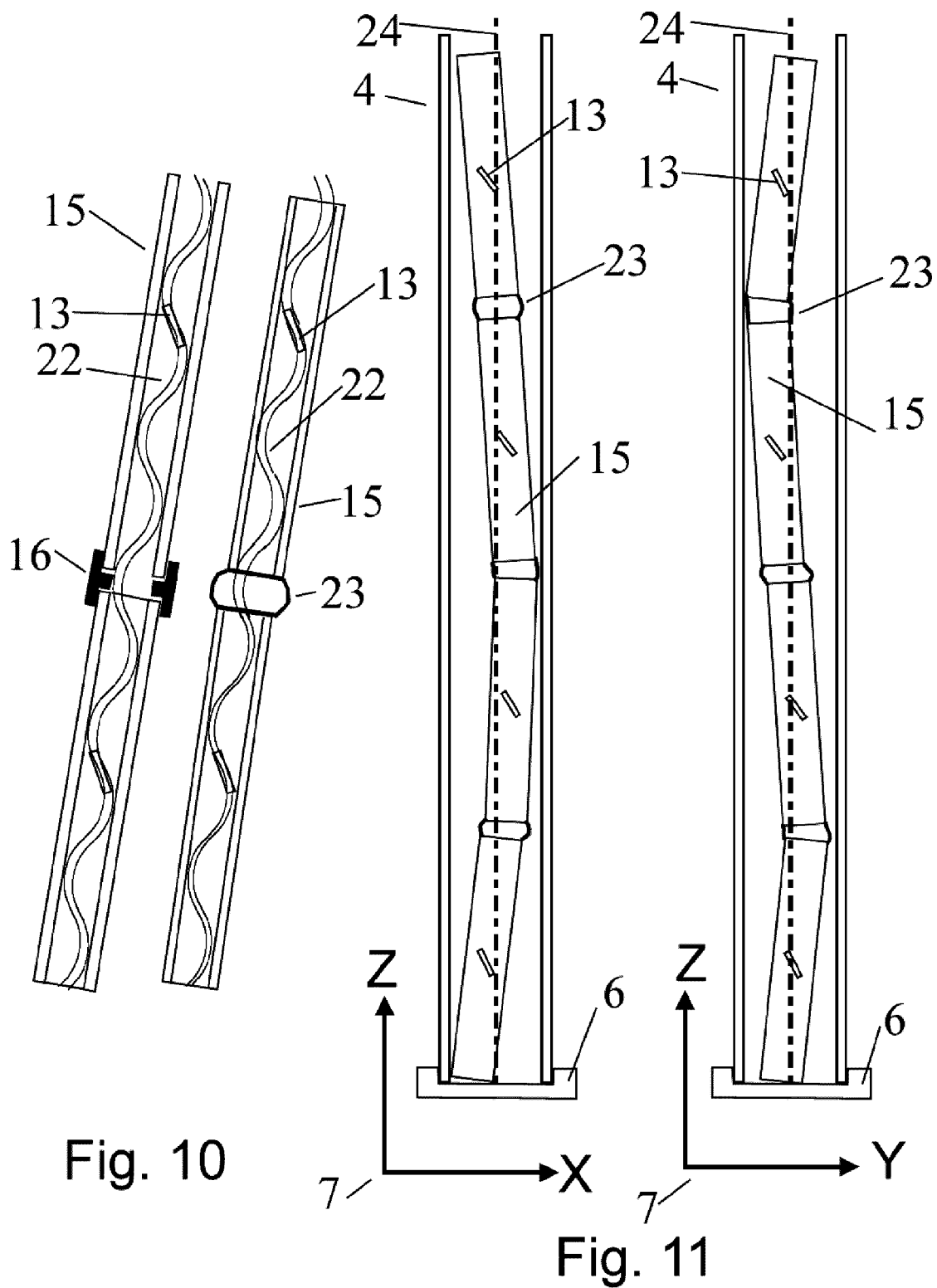

BIPARTITE SENSOR ARRAY

FIELD OF THE INVENTION

This invention relates to sensor technology. In particular, the invention relates to a tool or device for measuring the shapes of soil and civil structures, and the changes in the shapes over time. The invention represents improvements in the inventions described in U.S. Pat. No. 6,127,672, issued Oct. 3, 2000 to Lee Danisch (Danisch '672); U.S. Pat. No. 6,563,107 issued May 13, 2003 to Lee Danisch et al. (Danisch '107), and U.S. Pat. No. 7,296,363, issued Nov. 20, 2007 to Lee Danisch et al. (Danisch '363), and improvements over prior-art inclinometer technology.

A preferred application, amongst others, is in the field of geotechnical sensing for monitoring movements of landslides and construction sites.

BACKGROUND OF THE INVENTION

In the field of geotechnical engineering, instruments called inclinometers are available for measuring tilt in vertical or horizontal boreholes, for the purpose of calculating a path of the borehole based on one- or two-degree-of-freedom tilts, the length of the inclinometer, and the known orientation of the inclinometer about its long axis, which is controlled by straight grooves in the inclinometer casing lining the borehole. The inclinometer is either moved along the casing and stopped at spatial intervals for reading tilt (traversing inclinometer), or multiple inclinometers rest in the casing and are read at intervals in time (in-place inclinometers). Traversing inclinometers and in-place inclinometers will be referred to here as "conventional inclinometers".

An improvement over in-place inclinometers has been patented (Danisch '363). It is a calibrated measurement instrument comprised of rigid tubes (rigid bodies) fitted with tilt sensors, the tubes separated by built-in bendable joints resistant to twist, that can be used directly without grooved casing to measure path shape and vibration along the path. Danisch '363 will be referred to hereinafter as "SAA", or ShapeAccelArray. The SAA does not require grooves in the casing to perform azimuthal alignment of each rigid body about the long axis of the SAA. The twist-resistant joints maintain azimuthal alignment. Azimuth of each rigid body, which is not physically controlled during manufacture, is calibrated at the end of the manufacturing process, by using the X and Y tilt sensors in each body to measure the "roll" angle of each body when the SAA is generally horizontal. During manufacture, all offsets and gains of the sensors are calibrated so that accurate tilt measurements can be made over a wide temperature range, and over all angles.

Both conventional inclinometers and SAA rely on gravimetric measurement of tilt. Measurement of tilt amounts to determining the portion of the gravity vector acting upon a mass supported by springs in a reference frame, as the axis of the reference frame is tilted. In some cases, conventional inclinometers use liquid-filled curved tubes instead of springs and masses. In other cases, servo-controlled springs and masses are used.

Calculation of shape from tilts is known from the prior art. In general, an array of rigid bodies separated by flexible joints can be portrayed as a polyline (line segments meeting at vertices), whose vertices represent the joint centers. Lengths of the line segments are usually taken to be the joint-center to joint-center distance when the array is straight. For a vertical array extending in Z, and bending in X and Y, X and Y tilt sensors are sufficient to sense the overall tilts of the rigid bodies. The Z sensor is needed only to report if the array is "upside down" or not. It is essential to constrain the joints to have either 1DOF of bend and 1DOF of twist, or 2DOF of bend without twist, or the azimuths of the X and Y sensors within the World Coordinate System (WCS) will not be known. With the joint constraint, it is possible to solve for X and Y tilts and to know their azimuth (compass) directions, even far from a reference end for the calculation. Constraint in inclinometer systems is provided by grooves in the inclinometer casing. The rigid bodies of inclinometers have wheels that fit into the grooves. For SAA, the joints are built to resist twist but permit 2DOF bend, or for ribbon-shaped forms of SAA, the joints have 1DOF of bend and 1DOF of twist. The constraint allows calculation of the 2DOF orientation of each segment relative to the one before, based on X and Y tilts.

Calculation of shape for horizontal prior-art straight arrays is limited to shape within a vertical plane containing the path of the array. Only the Z sensors are needed.

Deficiencies of conventional inclinometers include:
Traversing inclinometers (individual instruments lowered and read at intervals) must be read by a person at the site, so automated data collection at frequent intervals is not possible.
In-place inclinometer systems have multiple inclinometers connected as a chain, each inclinometer having wheels that fit into grooves in inclinometer casing. The "gauge length" of each individual inclinometer (an inclinometer is a rigid body) can be extended by means of a rigid rod with one of the wheel assemblies at its end. The installer must keep track of the order of inclinometers, their lengths, and their calibration coefficients. In-place inclinometer systems are known to be difficult to install and are often limited in length by the number of cables which must pass to the surface from each inclinometer. The cable problem can be circumvented by digitizing and using a common serial "bus cable", but at higher cost and still with the complexity of wheels and grooves.
Long gauge lengths lead to easy distortion or entrapment of in-place inclinometers even for small deformations, leading to loss of equipment and money.
Inclinometers use grooved casing to keep the axes of the inclinometers aligned to an azimuth. This precludes using stiff, thick metal tubes instead of the inclinometer casing, to provide protection. Wheels would have difficulty passing joints between sections of robust tubing.

Deficiencies of SAA include:
Although SAA is convenient because it is a calibrated, self-contained array that is stored on a reel, it is limited to short gauge lengths (lengths of its rigid bodies) because a very large reel would be required, and the small size of the casing in which it is installed would cause bending of its rigid bodies at very small deformations. The short segments must all have sensors, or information would be lost along the array. For example, if a narrow shear zone in the soil happens to tilt only one rigid body, with the other rigid bodies remaining upright, large errors would occur if the one tilted body had no sensors. The requirement for many short rigid bodies leads to higher cost.
Often construction sites are not expected to involve large deformations. It is sufficient to get a warning during the low-magnitude early phases of deformation. SAA has too many sensors and therefore too high a cost, for these situations, so its convenience in many construction monitoring applications is not always sufficient to justify its price.

Deficiencies of both in-place inclinometers and SAA include:

Neither type of instrument is armored to withstand crushing by rocky soil or pure rock formations. There is only plastic casing and a small amount of air between the delicate instrument and the outside medium.

Neither type of instrument can be retrieved from a casing that has been greatly deformed. There is insufficient room for either instrument to negotiate sharp curves or other deformations of the casing.

Prior-art inclinometers and SAA do not provide a convenient, no-wheels array that fits on a reel and is a self-contained, calibrated instrument not requiring special grooved casing, while simultaneously providing a means of having long rigid-body lengths upon installation.

Prior-art inclinometers with long gauge lengths in large-diameter casing, and SAA with short gauge lengths in small-diameter casing, do not provide for extracting the instruments after deformation has curved the borehole, by allowing a separate instrumented array having short rigid bodies to be pulled out of a sacrificial set of longer rigid bodies left in the borehole.

Prior-art inclinometers and SAA do not provide for longevity in rocky soils, by having robust outermost rigid bodies connected by bendable joints, the rigid bodies providing protection of internal, less robust rigid bodies, from rock forces.

Prior-art inclinometers and SAA do not provide for a very flexible array made of rigid bodies connected by flexures long enough to allow positional displacement, deployable from a reel, contained by a separate system of longer rigid bodies with joints providing bending without shear (i.e. preventing unmeasured lateral positional displacement of the contained inner array).

Prior-art inclinometers and SAA do not provide for a system of hollow rigid bodies and joints ("second hollow exoskeleton portion"), without sensors, that can be supplied locally from a variety of materials, and installed prior to arrival of a "second sensorized array portion" that fits inside, the two systems then working together to provide measurements of shape and deformation of shape, the sensorized portion being low in cost due to large spacing of sensors.

Related to the helical forms for some of the paths of the bipartite array components described herein, prior-art inventions have included non-straight sensor paths, but have relied on bend and twist sensors ("curvature" sensors). For instance Danisch '107 ("Shape Rope") describes "A measuring device for providing data corresponding to a geometric configuration in space, in the form of a flexible, compliant, measurement member capable of bending in at least one degree of freedom and extending along a medial axis or plane. The member has spaced flexure sensors distributed at known locations on the member and separated by known sensor spacing intervals to provide flexure signals indicating the local state of flexure present at the locations. The member comprises a multiplicity of formed, i.e. shaped, fibers, these fibers including sensing fibers having sensing portions which provide the flexure sensors, the sensing portions of different fibers being located at differing distances along the member so as to be located at the sensor spacing intervals, the formed fibers being in mutually supporting relationship, as by continuous or repeated contact with each other. Such fibers may constitute most or all of the member".

Devices using flexural sensors in concatenated arrays suffer from a serious deficiency: when there is an error in one of the sensors, the orientation of all of the array past that point in the order of calculation will share the angular offset of the error, which will cause the entire data set representing a measured path to swing well away from the path, by the angle of the error. This can result in a huge displacement at the end of the path.

Further, in Danisch '107 the fibers are pre-formed and in a mutually-supporting relationship that is not suited to being compressed axially and thereby swelling laterally to conform to an enclosing surface. Danisch '107 does not teach a straight array that may be rolled up onto a reel that can be deployed straight, and then formed into a helix by inserting it into a hollow exoskeleton portion and applying axial compressive force for secure containment. Instead, Danisch '107 requires that a multiplicity of fibers be pre-formed into mutually-supporting helices of fixed dimensions, the configuration not being amenable to the use of gravitational sensors measuring tilt. There is no teaching of rigid bodies separated by flexible joints, the rigid bodies providing a means of sampling tilt uniformly along a region, referenced to gravity, rather than sampling bend along a flexible member easily distorted by contact with objects. There is no teaching of flexible joints providing torsional stiffness but allowing bend, between rigid bodies. There is no teaching of referencing all the sensors to gravity, so that orientation errors cannot propagate up a calculation chain. There is no teaching of sensors in rigid bodies so that orientation may be read directly by gravimetric sensors, rather than inferred from measurements of bend and twist. Furthermore, there is no inclusion of a second hollow exoskeleton portion containing a first sensory array portion, thus providing advantages of protection of the first portion, reduction in the number of sensors, provision of long gauge lengths, and separate manufacture, supply, delivery, and installation of a second hollow exoskeleton portion.

Although 3D measurements can be made with bend and twist sensors over a full spherical range of orientations, the accuracy of bend and twist sensors excludes them from use for monitoring geotechnical parameters. Geotechnical measurements must be accurate to one or two millimeters over array lengths of tens of meters, for decades. Practical, low-cost bend and twist sensors, such as the fiber optic curvature sensors used in the Danisch '107 and '672 prior art, are not capable of such accuracy. They are capable of approximately 1 cm per meter, per day, which is orders of magnitude too poor for geotechnical measurements.

Danisch '672 ("Shape Tape"), which describes

"A position, orientation, shape and motion measuring tool is provided in the form of a flexible substrate with bend and twist sensors distributed along its surface at known intervals. A ribbon-type substrate is preferred. The geometric configuration of the substrate is calculated from inter-referencing the locations and orientations of the sensors based upon the detected bend and twist values. Suitable applications include motion capture for humans for use in animation, six degree of freedom input to a computer, profile measurement and location tracking within a large, singularity-free working space".

is not amenable to installation in hollow tubes for measuring 3D shape, as "Shape Tape" cannot bend within its plane, and would not respond well (it could buckle or break) to deformations of a hollow exoskeleton portion imposing such bends on its ribbon form. Nor does it teach use of gravimetric sensors for increased accuracy, as discussed above for Danisch '107.

None of Danisch '672, '107, or '363, nor prior-art inclinometry teach the securing of an array within a surface by means of lateral expansion caused by axial compression of the form of the array. Neither does any of the prior art provide a means of protecting arrays from external forces while maintaining good flexibility, by means of a hollow exoskeleton portion, or of using the same hollow exoskeleton portion to achieve long gauge lengths.

SUMMARY OF THE INVENTION

To overcome the deficiencies of conventional inclinometers and SAA, in one aspect of the present invention there is provided a bipartite sensor array comprising two portions capable of assembly into a single sensory system, wherein:
a first sensory array portion comprises:
a sensor array within a gravity field comprising:
sensorized rigid bodies having gravimetric sensors for measuring tilt of said rigid bodies in the gravity field, separated by elongate flexures,
the elongate flexures capable of non-monotonic and non-constant bend in two degrees of freedom,
the torsional stiffness of the elongate flexures selected from:
high when the bipartite array is installed in a non-horizontal path,
arbitrary when the bipartite array is installed in a non-vertical path,
all sensorized rigid bodies and elongate flexures having known dimensions,
at least one of said sensorized rigid bodies having a known position and orientation in the World Coordinate System,
said sensor array adapted for determining the orientation of each sensorized rigid body within the World Coordinate System from the dimensions and tilts of the rigid bodies and the torsional stiffness of the elongate flexures; and
a second hollow exoskeleton portion comprises:
hollow exoskeletal segments (HES) with known dimensions, separated by hollow exoskeletal joints (HEJ) with known dimensions,
said HEJ capable of bending in two degrees of freedom,
said HES and HEJ having a central volume capable of accepting insertion of said first sensory array portion,
the sensorized rigid bodies of the first sensory array portion remaining in unchanging orientation to the HES in three degrees of freedom,
the second hollow exoskeletal portion capable of being disassembled,
said HES, HEJ, sensorized rigid bodies, and elongate flexures of lengths permitting containment of at least one sensorized rigid body of said first sensory array portion within each HES following said insertion,
said first portion inserted into said second portion and adapted for determining the position and orientation of each HES within the World Coordinate System from the dimensions of the HES and HEJ, the tilts of the sensorized rigid bodies, the torsional stiffness of the elongate flexures, and the unchanging orientation of each sensorized rigid body to each HES; wherein the improvements over prior art are:
The provision of a sensing system with long gauge lengths, transportable as a separate, compact, calibrated, waterproof, electromechanical sensory portion rolled on a reel, and another uncalibrated set of uncalibrated hollow mechanical-only parts that together form a calibrated sensory system after installation,
The HES not requiring assembly with known torsional orientation from HES to adjacent HES.
Robust mechanical protection of the first sensory array portion,
Reduction of the number of sensors required to sense along a path, and
The first sensory array portion may be retrieved from the second hollow exoskeleton portion even if the second portion is entrapped.

In another aspect there is provided a bipartite sensor array comprising two portions capable of assembly into a single sensory system, the bipartite sensor array comprising: a first sensory array portion within a gravity field comprising: sensorized rigid bodies having gravimetric sensors for measuring tilt of said rigid bodies in the gravity field, the sensorized rigid bodies separated by elongate flexures, the elongate flexures capable of non-monotonic and non-constant bend in two degrees of freedom, the sensorized rigid bodies and elongate flexures having known dimensions, at least one of said sensorized rigid bodies having a known position and orientation in the World Coordinate System, the elongate flexures having a torsional stiffness selected from: (1) high when the bipartite array is installed in a non-horizontal path; and (2) arbitrary when the bipartite array is installed in a non-vertical path, said sensor array adapted for determining the orientation of each sensorized rigid body within the World Coordinate System from the dimensions and tilts of the sensorized rigid bodies and the torsional stiffness of the elongate flexures; and a second hollow exoskeleton portion comprising: hollow exoskeletal segments (HES) with known dimensions, separated by hollow exoskeletal joints (HEJ) with known dimensions, said HEJ capable of bending in two degrees of freedom, said HES and HEJ having a central volume capable of accepting insertion of said first sensory array portion, the sensorized rigid bodies of the first sensory array portion remaining in unchanging orientation to the HES in three degrees of freedom, the second hollow exoskeletal portion capable of being disassembled, said HES, HEJ, sensorized rigid bodies, and elongate flexures of lengths permitting containment of at least one sensorized rigid body of said first sensory array portion within each HES following said insertion, wherein said first sensory array portion is inserted into said second hollow exoskeleton portion and adapted for determining the position and orientation of each of the HES within the World Coordinate System from the dimensions of the HES and HEJ, the tilts of the sensorized rigid bodies, the torsional stiffness of the elongate flexures, and the unchanging orientation of each sensorized rigid body to each HES.

In one embodiment, the HES are cylindrical tubes with bending stiffness sufficient to keep the HES straight when subjected to a known range of external forces and moments.

In another embodiment, the HES are cylindrical tubes with bending stiffness sufficient to keep the HES bend generally constant over length when subjected to a known range of external forces and moments, and more than one rigid body of the first sensory array portion is contained within each HES, in order to measure and compensate for the bending.

In another embodiment, the HES and HEJ form a monolithic exoskeleton by virtue of having the same stiffness in bending, and the sensorized rigid bodies of the first sensory array portion are spaced at intervals sufficiently close along the exoskeleton to sample tilts representing the shape of the monolithic exoskeleton to a desired level of accuracy, when the exoskeleton is subjected to a known range of external forces and moments.

In another embodiment, the unchanging orientation is achieved by forming the first sensory array portion into a helical shape within the HES and HEJ, in repeated contact with the inner surfaces of the HES and HEJ.

In another embodiment, the unchanging orientation is achieved by a close fit between generally vertical rigid bodies and joints of the first sensory array portion and the inner surfaces of the HES and HEJ.

In another embodiment, the unchanging orientation is achieved by a close fit between generally vertical rigid bodies, and a helical shape of the elongate flexures in repeated contact with the inner surfaces of the HES and HEJ.

In another embodiment, the second hollow exoskeleton portion is in a helical shape in repeated contact with the inner surface of a cylindrical containment.

In another aspect there is provided a method of placing a first sensory array portion within a monolithic exoskeleton having uniform stiffness in bending along its length, the first sensory array portion sparsely populated with sensorized rigid bodies, the method comprising: assigning direct tilts to the portions of the exoskeleton corresponding to the locations of sensorized rigid bodies, and assigning interpolated tilts to the portions not corresponding to the locations of sensorized rigid bodies based on interpolation or spline functions operating on the direct tilts, the shape of the exoskeleton being determined by integrating the interpolated and direct tilts along the axial extent of the exoskeleton.

In another aspect there is provided a method of assembling HES and HEJ to form a straight containment, the method comprising: inserting a first sensory array portion into the containment, the first sensory array portion having sensorized rigid bodies and elongate flexures with high torsional stiffness, securing the first sensory array portion in the containment to form a bipartite sensor array with unchanging orientation of each sensorized rigid body to each HES, securing the bipartite sensor array in soil or structure, using the contained sensors to read the tilts of the HES, and calculating the shape of the bipartite array from the dimensions of the HES and HEJ, the tilts of the sensorized rigid bodies, the torsional stiffness of the elongate flexures, and the unchanging orientation of each sensorized rigid body to each HES, when the HES and HEJ follow a non-horizontal path In another aspect there is provided a method of assembling HES and HEJ to form a straight containment, the method comprising: inserting a first sensory array portion into the containment, the first sensory array portion having sensorized rigid bodies and elongate flexures with arbitrary torsional stiffness, securing the first sensory array portion in the containment to form a bipartite sensor array with unchanging orientation of each sensorized rigid body to each HES, securing the bipartite sensor array in soil or structure, using the contained sensors to read the tilts of the HES, and calculating the shape of the bipartite sensor array from the dimensions of the HES and HEJ, the tilts of the sensorized rigid bodies, and the unchanging orientation of each sensorized rigid body to each HES, when the HES and HEJ follow a non-vertical path.

DESCRIPTION OF THE FIGURES

For a better understanding of the present invention, as well as other aspects and further features thereof, reference is made to the following description which is to be used in conjunction with the accompanying drawings.

FIG. 4: Elevation view of first sensory array portion with short flexures, only some segments populated.

FIG. 5: Elevation view of second hollow exoskeletal portion.

FIG. 6: 3D transparent view of HEJ.

FIG. 10: Two constructions for bipartite arrays, one with non-swelling joints, one with swelling joints.

FIG. 11: Orthogonal elevation views of the swelling-joint version of FIG. 10, in helical form in a casing.

DETAILED DESCRIPTION OF THE INVENTION

As used herein, the phrase "World Coordinate System" or "WCS" is understood to mean a set of cartesian axes referenced to Earth, or any other massive body. Without a rigid body in an array of rigid bodies having a known reference in both position and orientation to the WCS, it is still possible to know the shape of the array, but the orientation of the shape in the gravity field will only be partly known (azimuth will not be known), and there will be no positional information relative to the source of gravity. Gravity has a direction toward the center of a mass. "Gravity vector" refers to this direction. So does "the direction of gravity", which is what is referred to as "vertical" on Earth.

As used herein, the phrase "tilt" is synonymous with "orientation". The tilts referred to herein are concerned with are roll, pitch, and yaw. For example, a vertical cylindrical rigid body can roll about the vertical (Z) axis, pitch in an east-west (X) plane, and yaw in a north-south (Y) plane (these azimuthal planes are examples only; any orthogonal vertical planes could be designated).

Figure 1:
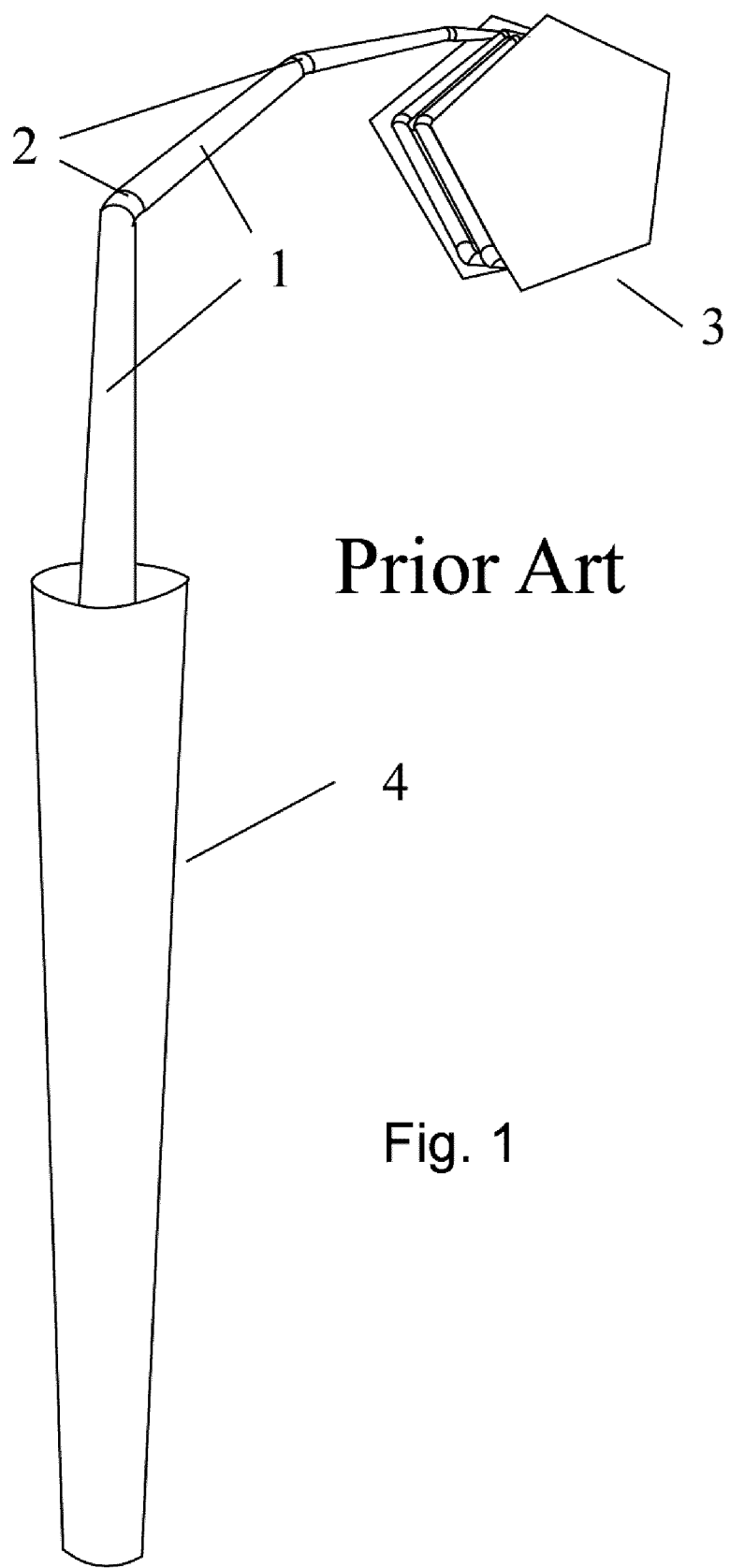
FIG. 1: Prior-art SAA being inserted into a borehole.

FIG. 1 shows a prior-art SAA being unreeled into a borehole. It has rigid bodies 1 joined by joints 2. Typically, the reel 3 is in a polygonal shape built to accommodate the segment-lengths (rigid body lengths) of the SAA. In this case a pentagonal reel is shown. The borehole 4 can be any cased or uncased hole in soil or drilled into a civil structure such as a pile, concrete or earth-filled dam. SAA can also be installed into straight runs of casing, horizontally in a ditch. It can also be in a generally circular arc in a tunnel, normally held within plastic casing. Each segment contains three accelerometers for measuring tilt and optionally useable for measuring vibration.

The prior-art SAA is a completely calibrated measuring instrument that can be formed into a shape without any additional structures, and will provide data representing that shape. All data exit the instrument on a single digital cable, due to use of in-array microprocessors and analog-to-digital converters. When the segments are vertical within approximately +/−60 degrees, 3D shape can be determined from the measured tilts and known lengths of rigid bodies and joints between them. When the segments are near-horizontal within approximately +/−60 degrees, software is used to provide only 2D data in a vertical plane, because of degradation of X and Y data within +/−30 degrees of horizontal. For near-horizontal sensing, mainly the Z tilt sensors are used (those with maximum response when segments are horizontal).

The terms "non-horizontal" and "near-vertical" are used herein to denote paths for the bipartite array that are sufficiently vertical to allow determination of 3D orientation and position data. As used herein, the terms "non-vertical" or "near-horizontal" denote paths that allow only 2D measurements. The paths suited to 2D measurements (non-vertical paths) require only the use of the Z tilt sensors, whose outputs are independent of the roll angles of the rigid bodies about the path of the bipartite array. The paths suited to 3D measurements (non-horizontal paths) require alignment of the roll angles of the rigid bodies about the path of the bipartite array, so that the X and Y sensors will be aligned in azimuth. The non-horizontal paths require high torsional stiffness in the elongate flexures of the first sensory array portion.

Figure 2:
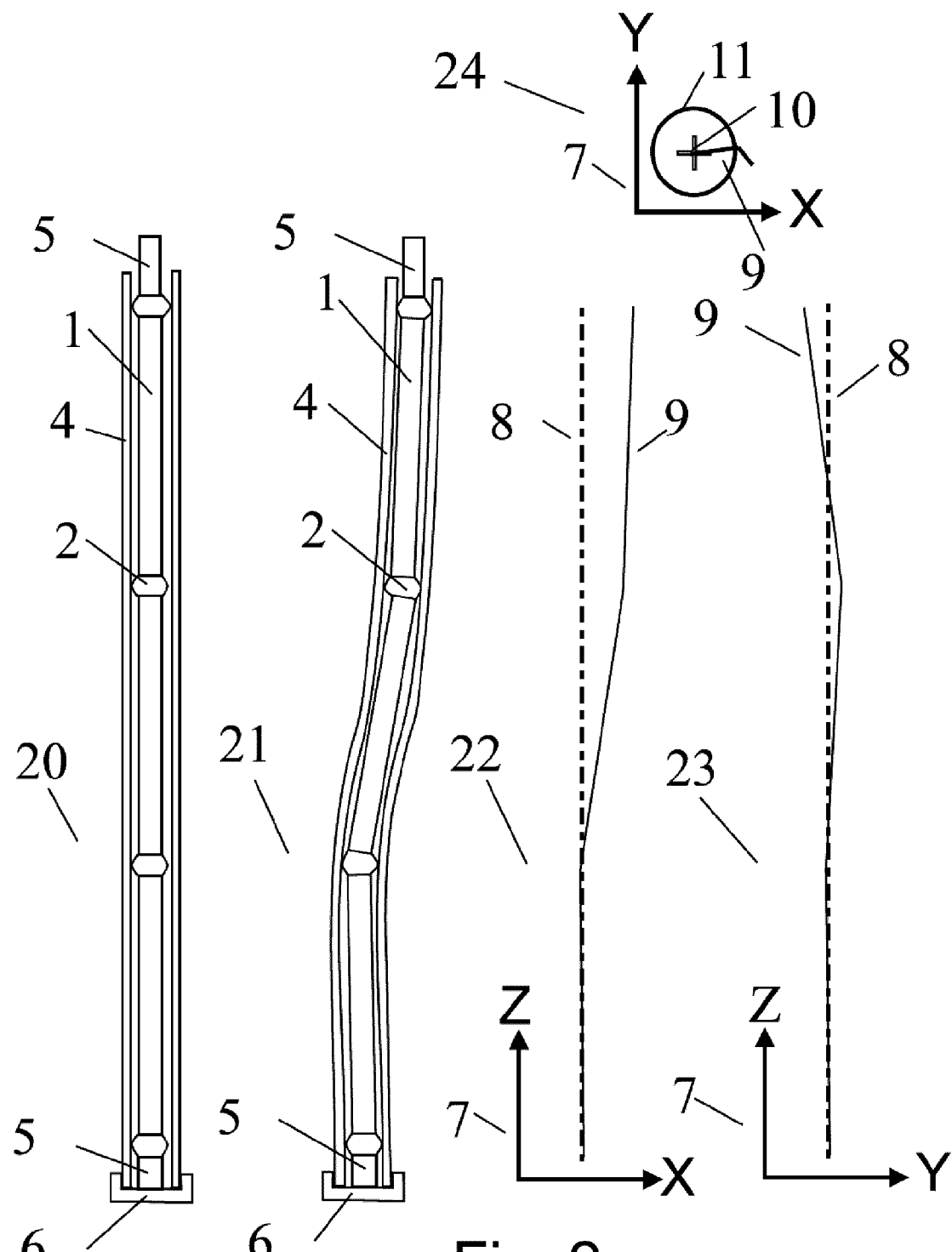
FIG. 2: Elevation views of prior-art SAA in casing, straight and deformed, and three graphs of data from orthogonal views.

FIG. 2 shows a prior-art installation of SAA within a vertical casing 4 in a borehole (not shown). The casing is held secure within the borehole by grout (not shown). The SAA is comprised of rigid bodies 1 in the form of tubes, connected by joints 2, which can bend in 2DOF but not twist. Shorter rigid bodies 5 in FIG. 2 denote a continuation of the SAA for visual effect and can be assumed to be unmoving (not contributing to the data). The casing has a cap 6 at the bottom.

An axial force has been applied to the SAA, causing the joints to swell and hold it snug within the casing. A first view 20 shows an XZ elevation of the SAA and casing before any deformation. A second XZ elevation view 21 shows the system after the soil has deformed laterally. Two graphs 22 and 23 of deformation data are shown. 21 is the XZ view, 22 is the YZ view. The dashed line 8 in each graph shows the shape of the SAA at a first time. The solid line 9 in each graph shows the deformation at a second time. Graph 24 is an XY view of the deformation. The "+" mark 10 locates the axis of the SAA before deformation. The circle 11 represents the inside diameter of the unmoving bottom portion of the casing. The solid line 9 in Graph 24 is a top-down plan view of the solid lines shown in the XZ and YZ views, 22 and 23 respectively. Axes 7 in Graphs 22-24 indicate the coordinates of each view: XZ, YZ, and XY respectively.

The first portion of the bipartite array is an array of rigid bodies, such as cylindrical tubes, connected by flexures that are torsionally stiff if the path of the array is to be non-horizontal, and may be of arbitrary torsional stiffness if the path of the array is to be non-vertical. The flexures can be so long that they permit large displacements of position between rigid bodies, so the first portion cannot be used by itself to sense 2D or 3D shape. Modelling of shape along a path using tilt sensors requires that there be hinge-like joints between the rigid bodies containing the tilt sensors, and that all rigid bodies be fitted with sensors. Otherwise, lateral translation of adjacent rigid bodies could change the shape without changing any tilts.

Helixes are mathematical space curves that have constant bend and twist along their lengths. It is important to note that mathematical twist of a space curve is not necessarily the same as mechanical twist, which is caused by torsional shear of a tubular solid. A space curve has no thickness, so cannot have mechanical torsion (mechanical twist) along its length. A flexible cylindrical solid, such as a rubber rod, can be formed into a helix and may have significant mechanical twist. A straight rod may have mechanical twist, but can never have mathematical twist, because its central axis is a straight line. For the helical rod, the magnitude and direction of the mechanical twist may be quite different from the mathematical twist calculated for the path of the center of the rod (a space curve). In this description, when it is said that a flexure or joint has no twist, or allows no twist, this refers to the mechanical twist. The mathematical twist is determined entirely by the shape (e.g. the mathematical twist of a helix of a given diameter and pitch). The mechanical twist is allowed, or not, by the torsional stiffness of the material. Torsional stiffness is the amount the ends of a sample, such as the ends of a tube, can be rotated for a given moment applied end-to-end when the sample is straight. High torsional stiffness results in small rotations for a given torque.

Torsional stiffness, like stiffness of any material, applies within a range of applied torques over which the stiffness is generally linear and any twist generated by torsion returns elastically after it is removed. When a torsionally stiff tube (or rod, hose, etc.) is formed into a helical shape, the mathematical twist of the helical form (a space curve without thickness) will result in application of torsion to the tube. In this description it is assumed that this torsion is allowed to be applied and is kept within the elastic limits of the torsional degree of freedom of the tube. For helixes with few turns per axial length, the torsion will be very low and will affect very minimally the azimuthal alignment of the sensors on the helix. For instance, a helix with radius of 50 mm and a pitch angle 10 degrees from vertical will have a twist of 0.33 degrees per 3 m of length, which is a typical specification for inclinometer casing. In practical terms, keeping the mechanical twist of an array at a minimum when forming a helix amounts to allowing the tube to take on the mathematical twist as the helix is formed, without restriction or interference. If the pitch angle is more horizontal, so that more mathematical twist exists, then more torsion will be applied to the tube. The system must be designed to keep this torsion within the elastic limits of the tube. The tilt sensors can be used to read the amount of twist and the mathematics used to calculate the shape of the helix can be suitably adjusted. The reading of twist by the sensors becomes more accurate as the rigid bodies become more horizontal. This is a consequence of the increasing magnitudes of both ax and ay in a tan (ax/ay), which is the "roll" angle of a rigid body, and ax and ay are the static X and Y accelerations of the sensors most sensitive to tilt when the rigid body is vertical.

So when it is said herein that flexures or joints "cannot twist", or are "torsionally stiff", or have "high torsional stiffness", it is meant that the torsion is within elastic limits and the twist is either negligible or can be corrected using the known geometry, and measurements of roll angle. Preferably, the mathematical twist is kept negligible, which can usually be accomplished by selecting a favorable geometry for the shape of the array.

The second portion, the hollow exoskeleton, must meet the requirement for having joints (HEJ) that can be modelled as 2DOF hinges (hinges that bend in any direction approximately about a central point). The joints of the second portion need not necessarily exclude twist, as this condition can be enforced by the first sensory array portion, which has flexures resistant to twist. Secure contact between the rigid bodies of the first portion and the rigid bodies of the second portion can be sufficient to exclude twist from both. Also, some installations, such as those grouted in or with geometrical constraints, may prevent any twist of the HEJ. For greater certainty, and for larger deformations, however, it can be advisable to have the HEJ also resist twist. Since there are fewer joints in the outer second portion, this can be accomplished by simply keeping the joints short. It is also possible to add braid to the joints to resist twist. Positional translation should not be allowed in the HEJ. They should only bend.

The rigid bodies of the first sensory array portion have known azimuthal orientation to each other when generally vertical. This is accomplished by a prior-art method of using the X and Y sensors in each sensorized rigid body to measure the roll angle of the body while the first sensory array portion is straight and horizontal. The roll angle of each is a tan(ax/ay), where ax and ay are the static accelerations read by the X and Y sensors. The X and Y sensors are MEMS (micromachined electromechanical system) accelerometers oriented to read acceleration of gravity with maximum sensitivity when the rigid body is vertical. By characterizing the roll angles, the array may be calibrated for roll, which is important when the array is non-horizontal. The roll calibration is equivalent to knowing the azimuth of each rigid body when non-horizontal.

Naturally, preservation of roll angle calibration over time depends on having high torsional stiffness of the elongate flexures in the first sensory array portion. This is not necessary for bipartite arrays that will be used in non-vertical installations, but is not undesirable. High torsional stiffness allows for installation in any orientation.

In contrast to the known azimuthal orientation of the first sensory array portion, the second hollow exoskeletal portion need not have its joints aligned azimuthally when it is assembled. This makes the assembly and construction lower in cost. For instance, inclinometer casing must be aligned very carefully at each of its joints, and includes special construction for achieving and maintaining this alignment.

The hollow exoskeletal segments (HES) can be made very robust, for example from thick metal, to resist crushing forces from the outside. HES can be made from local materials, such as steel pipe, aluminum pipe, carbon-fiber tube, or fiberglass tube. The hollow exoskeletal joints (HEJ) between the HES, can be cast from rubber, santoprene, or any flexible material. Preferably, the inside diameter of the HEJ and the HES should be the same, to prevent interference with insertion or extraction of the first sensory array portion. HEJ can be made in stiff pipe by making saw cuts in a circumferential direction within an axial portion of the pipe designated to bend as an HEJ. The other portions of the pipe will become HES. Multiple pipes may be tapped and threaded for assembly in the field.

The length of each HES can be quite long, such as 2 to 5 meters long, but shorter HES may be useful, particularly for sensing in rock, where the protective aspects may be more important that the sensor-reduction aspects. For any given HES length and HEJ length, the spacing of rigid bodies of the first sensory array portion should be such that one rigid body be contained within one HES upon union of the first portion and second portion. Preferably, the spacings should be matched when both portions are straight, and the rigid bodies of the first portion should not coincide with the axial position of any HEJ, or the HEJ might be prevented from bending freely. When the HES are particularly long and it is feared they may bend somewhat over their lengths, two or more sensorized rigid bodies may be contained by each HES and would be used to account for the bend. Preferably, if a pair is used, they should be near the ends of each HES.

The second hollow exoskeleton portion offers protection of the first sensory array portion, while also offering flexibility much greater than permitted by a continuous casing, such as conventional inclinometer casing. The greater flexibility is of course due to the HEJ. For most deformations, short HEJ are suitable, so that the HEJ do not present a zone of weakness that could be penetrated easily by rocks.

Figure 3:
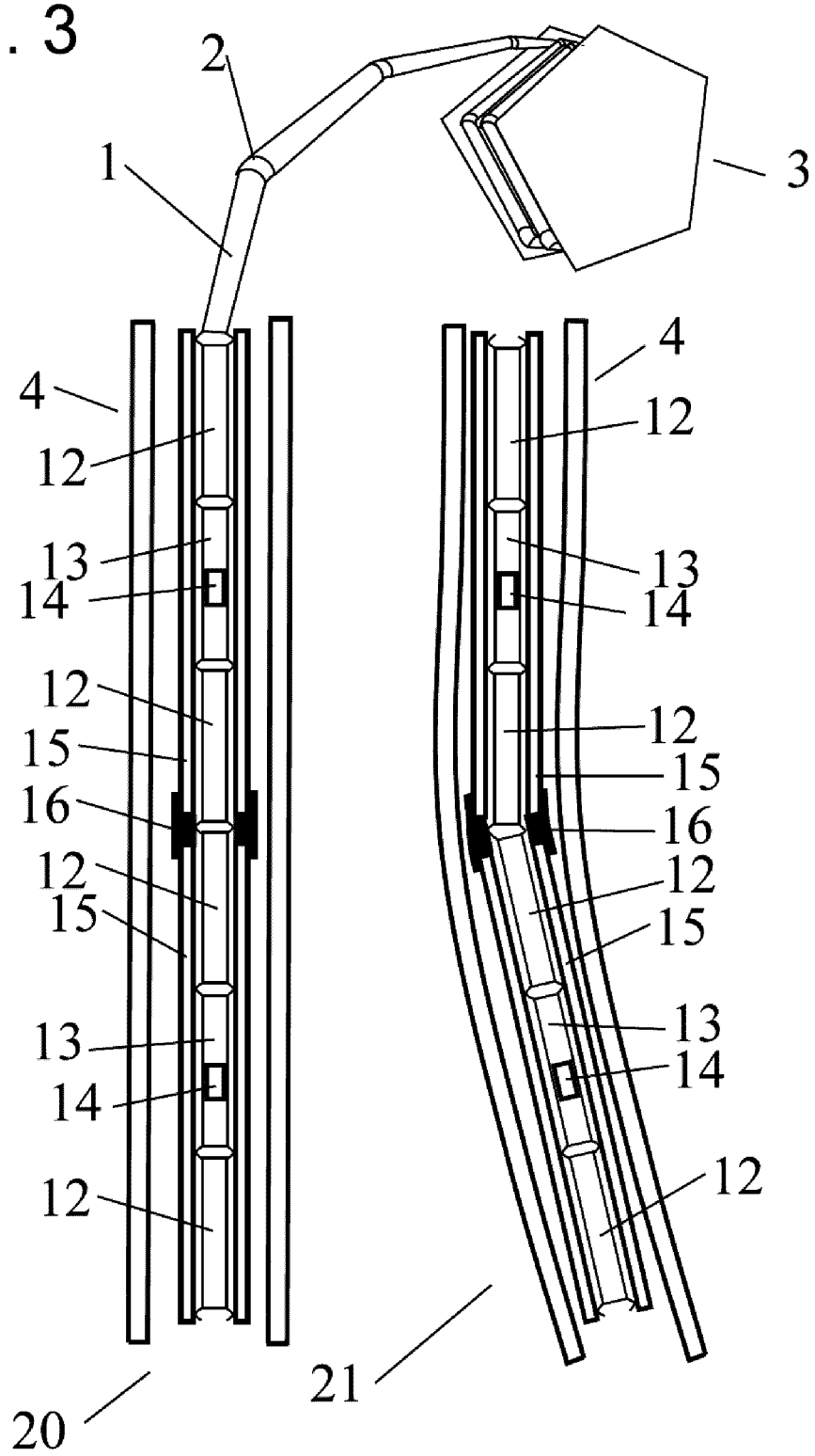
FIG. 3: Elevation views of bipartite array with first sensory array portion contained by HES and HEJ in a casing, the casing straight and deformed.

FIG. 3 shows a bipartite array comprised of a first sensory array portion comprising rigid bodies 1 and flexible joints 2, entering a cased borehole from reel 3. The borehole could as well be uncased. The joints are capable of bending in 2DOF and are torsionally stiff. Throughout the array, which is otherwise like prior-art SAA, the rigid bodies 1 are either populated with sensors 14, or not. Unpopulated rigid bodies and populated rigid bodies (i.e. unsensorized and sensorized) are designated 12 and 13 respectively. Sensors 14 can be uniaxial, biaxial, or triaxial, depending on the measurements to be made (typically 14 would represent a circuit board with sensors and ancillary electronic components mounted firmly inside the rigid body). For simplicity, only the rigid bodies inside the casing are shown as populated or unpopulated, but it is understood that this pattern can hold on the entire first sensory array portion. It is also possible for the distribution of sensorized and unsensorized rigid bodies to vary along the first sensory array portion, to match different lengths of HES and HEJ, or to provide an unsensorized "lead" portion where soil is not expected to deform and no measurements need be made.

Because they hold no sensors, the unsensorized rigid bodies 12 and their associated joints 2, separating sensorized rigid bodies 13, together form elongate flexures, the elongate flexures capable of non-monotonic and non-constant bend in two degrees of freedom, and torsionally stiff. This implies that the elongate flexures can introduce large errors to any measurement of shape of the first sensory array portion, unless it is contained within a second hollow exoskeleton portion, or otherwise constrained so that no tilt data are required from the elongate flexures.

The first sensory array portion is contained in the second hollow exoskeleton portion, in this example by means of prior-art joints 2 that swell under axial compression forces. The forces include gravity and any added force such as a weight, spring, or post-load held by a screw. The prior-art joints 2 expand laterally and shorten somewhat, under axial compression.

The second hollow exoskeleton portion comprises hollow exoskeletal segments (HES) 15 joined by hollow exoskeletal joints (HEJ) 16. In this example the HES are rigid tubes and the HEJ are elastomeric couplers attached to the ends of the tubes, for example by adhesive, rivets, screws, or by band clamps (not shown). In this example, the HES and HEJ would be grouted into the casing 4 (or grouted into an uncased borehole). It is also possible to couple the exoskeleton (HES and HEJ combined) to the larger casing or borehole by means of spacers or centralizers so that tilt of the larger body is transferred to each segment of the exoskeleton. At least one centralizer would be used per HES, and normally two would be required. Together, the first and second portions form a bipartite sensor array capable of acquiring data on the tilt of the HES within the borehole.

The first sensory array portion is arranged so that its joints 2 match almost exactly with the HEJ, and one sensorized rigid body is in each HES. The HES and HEJ contain the first sensory array portion. This is referred to in this disclosure as "containment" of the first sensory array portion.

In FIG. 3, view 20 shows the bipartite sensor array within an undeformed casing. In view 21 (reel omitted for simplicity), the casing has been deformed by soil movement or movement of a structure or any medium holding the casing. The HES remain rigid and tilt to conform to the new shape of the casing, bending at the HEJ. The sensorized rigid bodies 13 provide a measurement of tilt from each HES, as they are securely contained within the HES.

FIG. 4 shows a first sensory array portion, unconstrained by containment in the second hollow exoskeleton portion of a bipartite array. The extent of a first sensory array portion (to the extent drawn in the figure; the first portion would normally continue above and below the drawing) is indicated by bracket line 19. It is comprised of sensorized rigid bodies 13 containing sensors 14, and unsensorized rigid bodies 12. Prior-art joints 2, flexible in 2DOF of bend and torsionally stiff, connect rigid bodies of both types. The extent of one sensorized rigid body is shown (for emphasis) with bracket 17. The unsensorized rigid bodies and joints between sensorized rigid bodies together form elongate flexures 22, the elongate flexures capable of non-monotonic and non-constant bend in two degrees of freedom, and torsionally stiff.

FIG. 5 portrays the second hollow exoskeleton portion. Its extent in the drawing is shown by bracket 20. The second exoskeletal array portion is comprised of hollow exoskeletal segments (HES) 15 (tubes in this example), joined by hollow exoskeletal joints (HEJ) 16 (flexible elastomer in this example). The HES fit into an outer large-diameter region 21 at each end of the HEJ. A smaller-diameter region 22 in the center of the HEJ provides a stop for the HES, provides a flexible region, and matches the inner diameter of the HES so that the first sensory array portion can pass smoothly through the joint.

FIG. 6, a transparent view of the HEJ 16, shows the diameter 23 of the smaller-diameter region (22 in FIG. 5), and the diameter 24 of one of the two larger-diameter regions of the HEJ (21 in FIG. 5).

Figure 7:
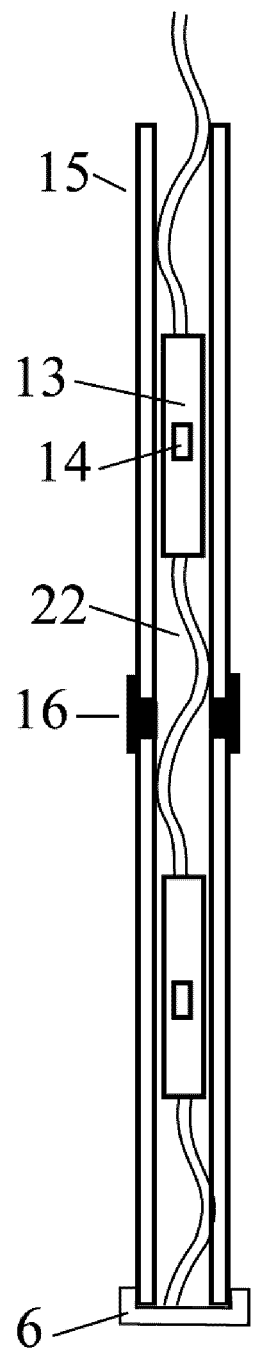
FIG. 7: Elevation view of bipartite array with first sensory portion with long flexures in helical form, contained by HES and HEJ.

An alternate version of a bipartite array is shown in FIG. 7, where the first sensory array portion has rigid bodies 13 having sensors 14. The rigid bodies are separated by long flexures 22 that bend but are torsionally stiff. Without containment by the second hollow exoskeleton portion, the first portion would be a poor measurement tool, capable of missing measurement of any tilts between rigid bodies. The flexures are formed into helixes that have axial compressive force applied, keeping the flexures stable in the HES 15 because a helix will expand laterally under axial compressive force. The rigid bodies of the first portion are kept stable as a result of forces and moments of the helical flexures 22, and may be kept additionally stable by a close fit or springs. The flexures can bend or displace laterally from end to end, but are torsionally stiff.

The alternate version of FIG. 7 has the advantage that the long flexures reduce the demands on tolerance of length of the parts of the first sensory array portion, so that it is easy to always have a flexure of the first portion where there is a flexible joint (HEJ) of the second hollow exoskeleton portion. This can be seen near HEJ 16 that connects the two HES 15 together. Most bipartite arrays would have many more rigid bodies, joints, HES, and HEJ.

The ability of the flexures to displace laterally when not in the second hollow exoskeleton portion, allows for many more options for packing the first sensory array portion for shipping, and makes for easy handling in the field.

Figure 8:
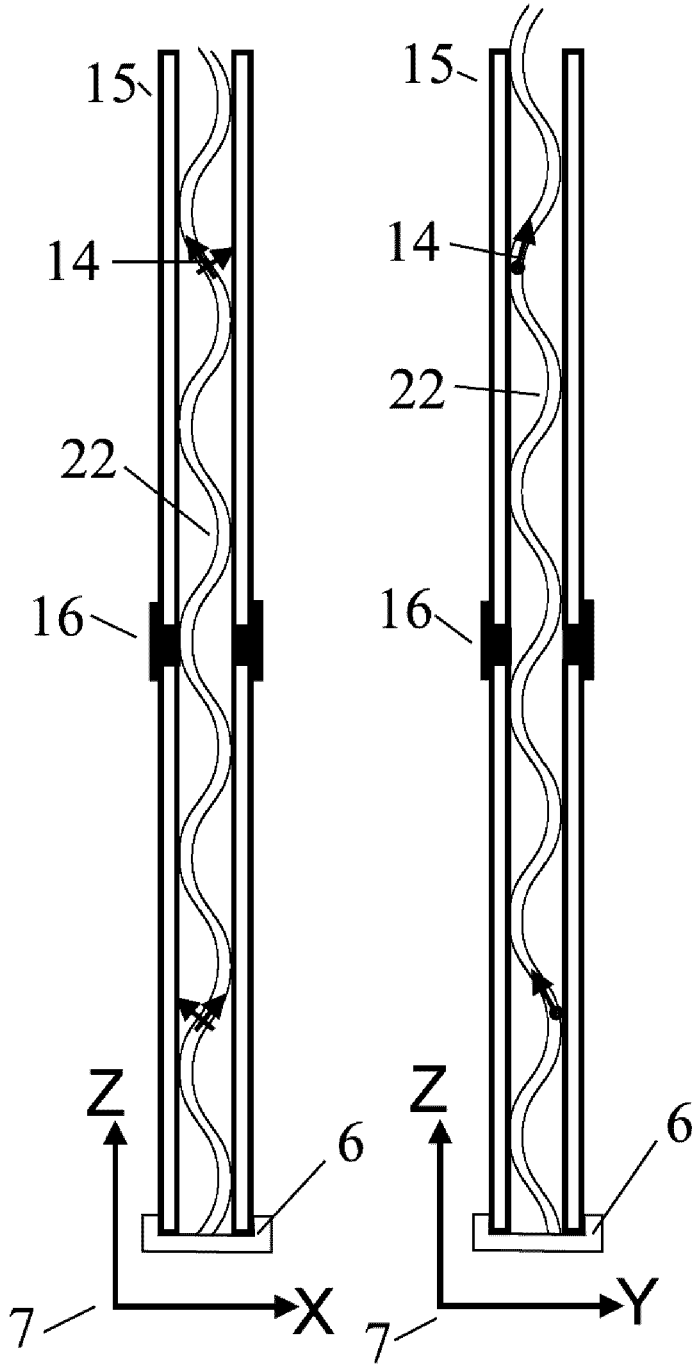
FIG. 8: Orthogonal elevation views of bipartite array, the first sensory array portion built in a torsionally stiff hose.

FIG. 8 shows two orthogonal elevations (coordinates are indicated by axes 7) of a bipartite array, with a first sensory array portion made of a torsionally stiff hose 22 containing sensors 14 at intervals. Sensors 14 can biaxial or triaxial. Two axes (both labelled 14) of the sensors are shown as two arrows in the XZ view and as one arrow in the YZ view, because they are in a plane seen in orthogonal views. The helical shape keeps the entire hose secure in the HES, due to application of axial compressive force, which may be from gravity or gravity plus added force. The added force is desirable near the top of the bipartite array, where there is insufficient array above to create enough force through gravity alone. The axial force will cause the helix to expand, until it is forced against the inside of the HES 15 and HEJ 16. The hose has a wide separation of sensorized rigid bodies, so that the hose between rigid bodies is free to bend and displace, but is torsionally stiff. The HES and short HEJ prevent displacement, and permit 2DOF bend without displacement or twist. End cap 6 provides reaction force for axial compressive force applied to the helix.

Figure 9:
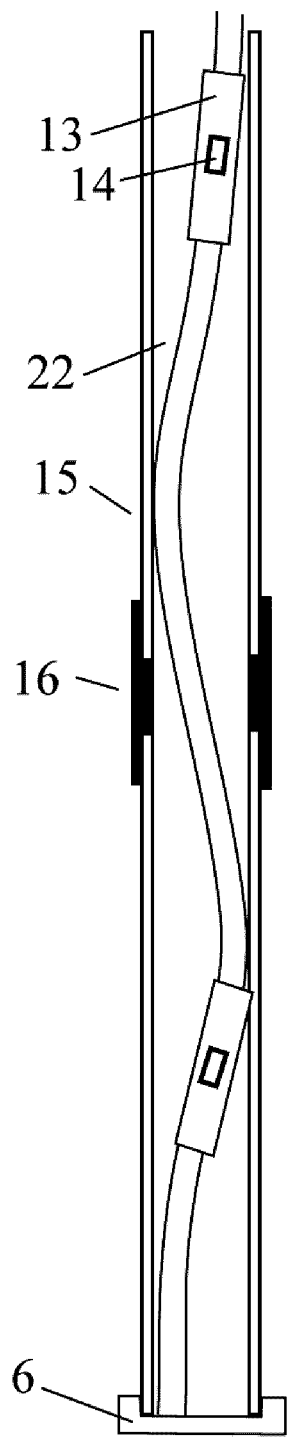
FIG. 9: Elevation view of bipartite array formed into a helix, the first sensory array portion built with hydraulic hose joining rigid bodies.

FIG. 9 shows a helical arrangement of the first sensory array portion, contained inside the HES 15 and HEJ 16. Sensorized rigid bodies 13 contain sensors 14 and are connected by a flexible tube 22 that can bend in 2DOF but is torsionally stiff, and can displace laterally if not further constrained in the second hollow exoskeleton portion formed by HES and HEJ. In this example, the entire path of the first sensory array portion, including the rigid bodies, is of generally helical shape.

In FIG. 9, as in FIG. 8, the first sensory array portion is kept secure and stable within the HES and HEJ due to the helix, which is expanded laterally under axial compressive force.

FIG. 10 shows two types of second hollow exoskeleton portion, with an internal first sensory array portion in the form of a helix made of flexible tubing 22 bendable in 2DOF and resisting twist, having rigid bodies 13 with sensors devoted to measuring tilt of the HES 15 when contained thereby. HES are connected by joints 16 or 23. Joints 16 are the same as those in previous figures, such as FIG. 9. Joints 23 are prior-art joints that swell laterally when compressed axially, as previously discussed in this description for use on the first sensory array portion. In this example they are optionally used in the second hollow exoskeleton portion. Joints 16 and 23 can bend in 2DOF. They may optionally allow some mechanical twist, if the torsional stiffness of the contained first sensory array portion is sufficiently great and its fit sufficiently tight to prevent twist of 16 or 23. For simplicity, sensors 14 are not shown on the figure, but are understood to be contained in the rigid bodies 13. HEJ 23 could be used to fit the second hollow exoskeleton portion tightly into a casing in a borehole, the casing only slightly larger in diameter than the HEJ. However, in the example of the next figure it will be used in a helical arrangement of the second hollow exoskeleton portion.

The helical arrangement of the first sensory array portion within the second hollow exoskeleton portion leads to an offset between the tilt of the HES and the tilt of the rigid body in the first sensory array portion. But this offset can be known and accounted for. It will remain constant over a wide range of angles of the HEJ 16, since the helical shape forces the rigid body of the first portion against the inner wall of the HES.

In FIG. 11 the bipartite array is arranged in helical form within a casing 4, fitted with a bottom cap 6. The rigid bodies 13 of the first sensory array portion are shown in FIG. 11, but (for simplicity) neither the flexible tube 22 holding them, nor the sensors 14 in the tube is shown. The second hollow exoskeleton portion could just as well have the non-swelling joints (16 in FIG. 10) because the helical form provides a secure placement of the bipartite array in a casing. But in this example it has swelling joints 23. Axes 7 label the coordinates for the two orthogonal views shown (XZ and YZ views). The center line of the helix 23 is also the center line of the casing.

So in the example of FIGS. 10 and 11, there is a helical form inside a helical form. The first helical form is of the first sensory array portion in the second hollow exoskeleton portion. The second helical form is of the bipartite array in the casing. The casing could be replaced by an uncased borehole or any cylindrical void. This second helical form, when fully assembled with first portion contained in second portion, comprises sensorized rigid segments (HES) separated by short joints (HEJ) that permit 2DOF bend, no twist, and no positional displacement.

In a typical installation of a bipartite array, the first sensory array portion would arrive on a reel, and the second hollow exoskeleton portion would arrive in a box of separate HES and HEJ. The HES and HEJ would be connected together as both are inserted into a vertical borehole to form a descending chain of HES, the bottom-most HES being capped. The HES and HEJ would then be suspended vertically above the bottom of the borehole, and the first sensory array portion would be unreeled into the HES and HEJ. Axial compressive force would be added to form the first sensory array portion into a helical shape, or for first-portion rigid bodies fitting closely in the HES, axial force could be added to expand joints for a secure fit.

The HES and HEJ would then be lowered to the bottom of the borehole and extra axial compressive force beyond that of gravity, if necessary, would be added to form the bipartite array into its final form in the borehole. The final form could be a helix, or, particularly if the HEJ were expansive, could be straight within the casing.

The casing of boreholes could be left out, with the HES and HEJ in contact with the soil around the borehole, or could be grouted into the borehole. HES and HEJ could also be grouted into the casing if it were present. If grouted in, the HES and HEJ would not be removable, but the first sensory array portion would be removable. In general, the HES and HEJ of the second exoskeleton portion are contained within a generally cylindrical borehole (cased or uncased), so are within a "containment." In some cases the containment of the second hollow exoskeleton portion is not in a borehole in soil, but rather could be any cylindrical void in or on a structure.

When the HES and HEJ are straight, suspended in the borehole, data can be acquired from the first sensory array portion. This data can be used to confirm angular offsets between the HES and the sensorized rigid bodies, or to measure them. Confirmation would be related to cases where the offset angles are already known from the dimensions and expected helical shape (if a helix is used) of the first sensory array portion, and the HES are not perfectly vertical, so that primary measurement is not possible. Full confirmation would require rotating the bipartite array in the borehole by a known amount to reveal the offsets and the tilts of the HES in the second hollow exoskeleton portion.

A similar assembly of the array can be made in a horizontal ditch, or pulled into a horizontal casing. For instance, the HES and HEJ could be pulled into a horizontal casing. Then the first sensory array portion could be pulled into the HES and HEJ. The first sensory array portion could be left at the bottom of each HES, held there by gravity. Or the various helical or swelled-joint methods of securing could be implemented, usually by adding axial compressive force.

Any of the examples of HES and HEJ portrayed in FIGS. 3 through 11 may be modified so that the HEJ have the same stiffness in bending as the HES. In this case the exoskeleton becomes a monolithic structure with homogeneous response of bending to forces applied anywhere along its length. In this case the HEJ are near-rigid couplers and can be reduced in number along the length. This "monolithic exoskeleton" case will be seen as an extension of the case, introduced earlier in this specification, wherein more than one sensorized rigid body is contained within a long HES, the HES sufficiently long that it may bend, and the multiple sensorized rigid bodies are used to sample said bending. The monolithic construction may be applied to any of the various installation methods including helical forms. In the helical case, the stiffness in bending of the exoskeleton must be sufficiently low to permit a practical axial force to form a helix, and sufficiently high that the helix does not reverse direction from clockwise to counter-clockwise or vice-versa. A limitation of the monolithic case is that applied deformations must be such that important details of tilt will not be missed in the portions of the exoskeleton not served by the sensorized rigid bodies. But there are many such cases, particularly in construction projects where abrupt shear zones are typically not present and where deformations are typically modest in magnitude, or where the instrument is being used simply to confirm that no deformation took place.

In the monolithic case, deformation may conveniently be measured by considering the exoskeleton to behave as a mechanical spline, or thin member that bends in a fashion that can be modelled as a mathematical spline curve using polynomial fitting or interpolation functions. Such functions can "fill in the gaps" of missing tilt information, based on the properties of splines. Thus, the monolithic case, sparsely populated with sensorized segments, can be another means of having extended segments. In the monolithic case the extension is "continuous", vs. "discrete" as in the case where HEJ are more flexible than the HES. The sparsely populated exoskeleton has portions associated with, or corresponding to, the location of sensorized rigid bodies, and portions not so associated or corresponding. At the former can be measured "direct" tilts, i.e. the actual tilt of the direct portion. At the latter, can be referred to as "interpolated" tilts. Some interpolation and spline functions may preserve the direct tilts, others may not, when forming a set of closely-spaced data representing nearly-continuous tilt along the exoskeleton. The interpolation or spline function can be selected to most closely represent the mechanical properties of the exoskeleton in response to bending.

Splines are low pass filters for spatial frequency components, such that abrupt changes in tilt corresponding to high spatial frequencies, are removed. Sampling tilt along a spline is analogous to sampling a waveform in time. When sampling a waveform in time, one must ensure that the waveform contains no frequency components above half the sampling frequency, or information will be lost. This is the "Nyquist Criterion", part of the "Shannon-Nyquist theorem" (see C. E. Shannon, "Communication in the presence of noise", Proc. Institute of Radio Engineers, vol. 37, no. 1, January 1949). The Shannon-Nyquist Criterion can be used to design the spacing of the sensorized rigid bodies within a monolithic exoskeleton, or any HES that are sufficiently long in a non-monolithic exoskeleton, to warrant the use of more than one sensorized rigid body per HES.

Figures 12, 13, 14:
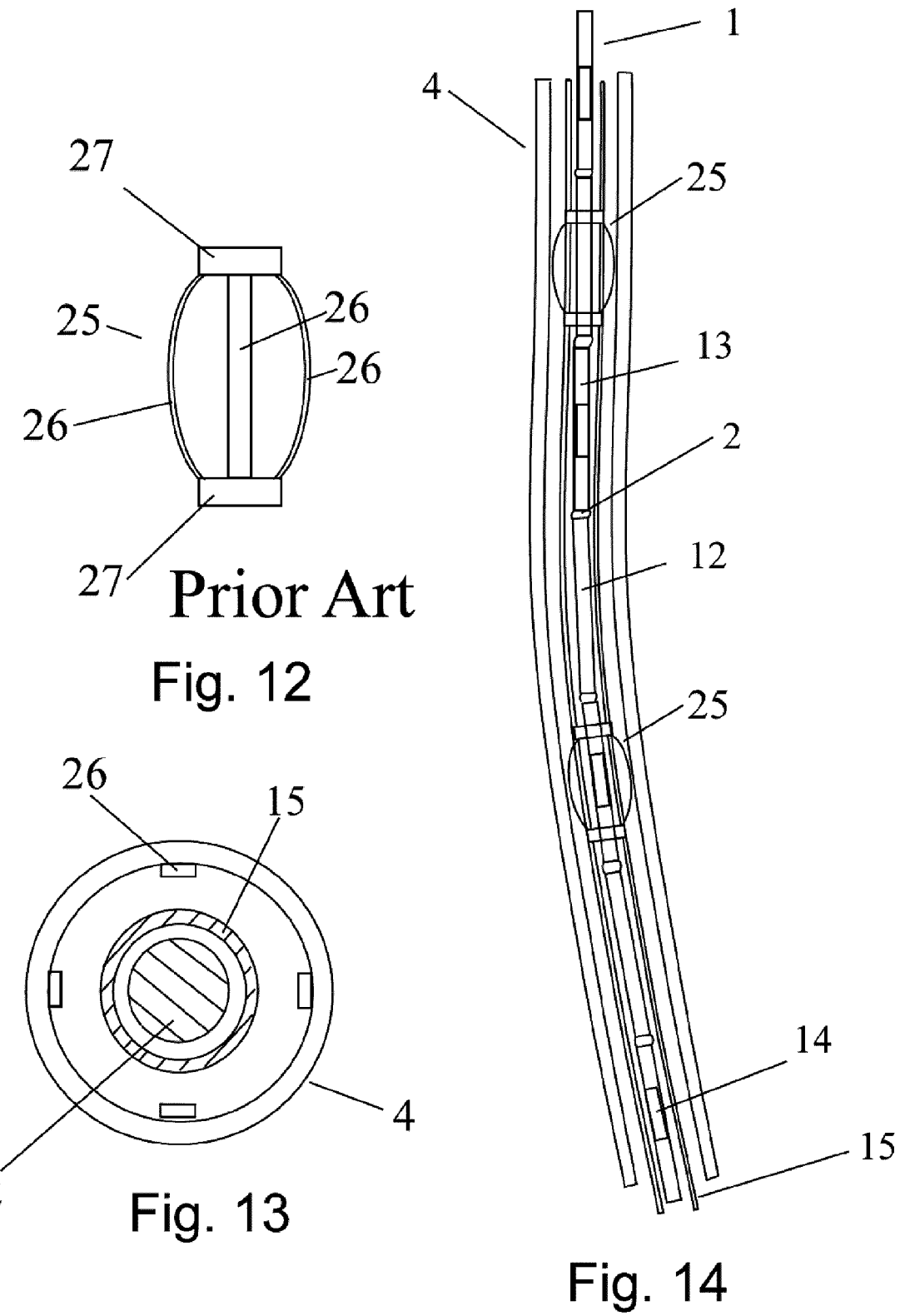
FIG. 12: Elevation view of a prior-art bowspring centralizer.
FIG. 13: Sectional view of a monolithic exoskeleton held in a casing by a bowspring centralizer.
FIG. 14: Elevation view of a monolithic exoskeleton with a first sensory array portion inside, held in a casing by bowsprings.

One example of the monolithic case is shown in FIGS. 12 through 14. FIG. 12 shows a prior-art bowspring centralizer 25, used to keep a tube at the center of a larger tube. The centralizer has the form of an eggbeater. Bowsprings 26, which may be made of rectangles of curved spring steel, are provided with mounting rings 27 in the form of circular bands, for affixing the centralizer to the outside of a circular tube. FIG. 13 shows a sectional view of a centralizer, the section taken where the bowsprings reach their lateral limit, holding a monolithic exoskeleton 15 near the center of a casing 4, by means of four bowsprings 26. For simplicity, the mounting rings are not shown. The innermost circular object 12 represents a segment of a first sensory array held within the exoskeleton 15 by means of swelling joints or other securing means.

Other types of prior-art centralizers include tight-fitting cylinders, spiral springs, and wheel assemblies with springs. Centralizers may project into the grooves in inclinometer casing to provide control of the azimuth of the monolithic exoskeleton. Another name for centralizers is "spacers".

FIG. 14 shows a first sensory array portion comprising rigid bodies 1 and flexible joints 2, inside a second exoskeleton portion 15, in this case a monolithic flexible tube. Sensorized rigid bodies 13, designated by a small rectangle 14 representing sensors attached to the rigid body, alternate with unsensorized rigid bodies 12. The exoskeleton is held within a casing 4 by bowspring centralizers 25.

When a monolithic exoskeleton is supported in the casing or borehole using centralizers or spacers, the placement of spacers can be determined by applying the above Shannon-Nyquist Theorem. The centralizers transfer displacement of the borehole to the exoskeleton. The mechanical properties of the exoskeleton, i.e. its stiffness in bending, possibly modified by the array inside, and as held by the spacers, determine the highest spatial frequency content of the exoskeleton. The spacers or centralizers must be at intervals sufficiently small that the spatial frequencies of displacement of the casing are transferred to the exoskeleton with a desired level of fidelity. Fourier analysis of expected worst-case borehole shape can be used to select a centralizer spacing that will capture all important displacements to a desired level of accuracy.

Fourier analysis may also be used to ensure that the shape of the exoskeleton is sampled with sufficient frequency that the sampled tilts can be used to represent the shape of the exoskeleton.

Limiting the number of centralizers can result in cost savings and minimal installation time. Also limiting the number of sensors can result in a great saving in cost, and both the reduction in centralizers and of sensors can be designed using spatial frequency sampling theory.

Monolithic exoskeletons may also be used without spacers, with the exoskeleton grouted into a borehole (cased or uncased). The grout can be designed with sufficient flexibility to act as a continuous centralizer. Another option is to install the monolithic exoskeleton in the form of a helix, with the first sensory array portion inside. The first sensory array portion may consist of segments with small joints, or of rigid segments separated by longer flexible joints as already described for non-monolithic exoskeletons.

Using sampled tilt to calculate the shape of the exoskeleton comprises sampling tilt at known widely-separated intervals along the exoskeleton (wherever there are sensors), applying spline or interpolation functions to form a continuous or near-continuous series of closely-spaced tilts along the length of the exoskeleton, and then spatially integrating the closely-spaced tilts to obtain closely-spaced positions representing the shape of the exoskeleton. End conditions, such as an assumption of additional (virtual) segments with constant tilt beyond the exoskeleton, may be used to improve the interpolation near the ends of the exoskeleton.

The bipartite array offers cost reduction due to a lower sensor count per length, lower shipping costs for more robust construction (because the HES and HEJ can be made locally), and a lowering of complexity and difficulty of installation, which also lower the full cost. Protection of the first sensory array portion arises from ability to use thicker materials than conventionally possible for the segments, while keeping the delicate parts inside the second hollow exoskeleton portion. In all cases, unless the deformations are extreme, the first sensory array portion may be retrieved, even if the second hollow exoskeleton portion must be left behind.

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The invention claimed is:

1. A bipartite sensor array comprising two portions capable of assembly into a single sensory system, the bipartite sensor array comprising:
   a first sensory array portion within a gravity field comprising:
   sensorized rigid bodies having gravimetric sensors for measuring tilt of said rigid bodies in the gravity field, the sensorized rigid bodies separated by elongate flexures, the elongate flexures capable of non-monotonic and non-constant bend in two degrees of freedom, the sensorized rigid bodies and elongate flexures having known dimensions, at least one of said sensorized rigid bodies having a known position and orientation in the World Coordinate System, the elongate flexures having a torsional stiffness selected from: (1) high when the bipartite array is installed in a non-horizontal path; and (2) arbitrary when the bipartite array is installed in a non-vertical path,
   said sensor array adapted for determining the orientation of each sensorized rigid body within the World Coordinate System from the dimensions and tilts of the sensorized rigid bodies and the torsional stiffness of the elongate flexures; and
   a second hollow exoskeleton portion comprising:
   hollow exoskeletal segments (HES) with known dimensions, separated by hollow exoskeletal joints (HEJ) with known dimensions, said HEJ capable of bending in two degrees of freedom, said HES and HEJ having a central volume capable of accepting insertion of said first sensory array portion, the sensorized rigid bodies of the first sensory array portion remaining in unchanging orientation to the HES in three degrees of freedom, the second hollow exoskeletal portion capable of being disassembled, said HES, HEJ, sensorized rigid bodies, and elongate flexures of lengths permitting containment of at least one sensorized rigid body of said first sensory array portion within each HES following said insertion, wherein said first sensory array portion is inserted into said second hollow exoskeleton portion and adapted for determining the position and orientation of each of the HES within the World Coordinate System from the dimensions of the HES and HEJ, the tilts of the sensorized rigid bodies, the torsional stiffness of the elongate flexures, and the unchanging orientation of each sensorized rigid body to each HES.

2. The bipartite sensor array of claim 1, wherein the HES are cylindrical tubes with bending stiffness sufficient to keep the HES straight when subjected to a known range of external forces and moments.

3. The bipartite sensor array of claim 1, wherein the HES are cylindrical tubes with bending stiffness sufficient to keep the HES bend generally constant over length when subjected to a known range of external forces and moments, and more than one rigid body of the first sensory array portion is contained within each HES, in order to measure and compensate for the bending.

4. The bipartite sensor array of claim 1, wherein the HES and HEJ form a monolithic exoskeleton by virtue of having the same stiffness in bending, and the sensorized rigid bodies of the first sensory array portion are spaced at intervals sufficiently close along the exoskeleton to sample tilts representing the shape of the monolithic exoskeleton to a desired level of accuracy, when the exoskeleton is subjected to a known range of external forces and moments.

5. The bipartite sensor array of claim 1, wherein the unchanging orientation is achieved by forming the first sensory array portion into a helical shape within the HES and HEJ, in repeated contact with the inner surfaces of the HES and HEJ.

6. The bipartite sensor array of claim 1, wherein the unchanging orientation is achieved by a close fit between generally vertical rigid bodies and joints of the first sensory array portion and the inner surfaces of the HES and HEJ.

7. The bipartite sensor array of claim 1, wherein the unchanging orientation is achieved by a close fit between generally vertical rigid bodies, and a helical shape of the elongate flexures in repeated contact with the inner surfaces of the HES and HEJ.

8. The bipartite sensor array of any one of claim 1, wherein the second hollow exoskeleton portion is in a helical shape in repeated contact with the inner surface of a cylindrical containment.

9. A method of placing a first sensory array portion within a monolithic exoskeleton having uniform stiffness in bending along its length, the first sensory array portion sparsely populated with sensorized rigid bodies, the method comprising:

assigning direct tilts to the portions of the exoskeleton corresponding to the locations of sensorized rigid bodies, and assigning interpolated tilts to the portions not corresponding to the locations of sensorized rigid bodies based on interpolation or spline functions operating on the direct tilts, the shape of the exoskeleton being determined by integrating the interpolated and direct tilts along the axial extent of the exoskeleton.

10. A method of assembling HES and HEJ to form a straight containment, the method comprising:

inserting a first sensory array portion into the containment, the first sensory array portion having sensorized rigid bodies and elongate flexures with high torsional stiffness, securing the first sensory array portion in the containment to form a bipartite sensor array with unchanging orientation of each sensorized rigid body to each HES, securing the bipartite sensor array in soil or structure, using the contained sensors to read the tilts of the HES, and calculating the shape of the bipartite array from the dimensions of the HES and HEJ, the tilts of the sensorized rigid bodies, the torsional stiffness of the elongate flexures, and the unchanging orientation of each sensorized rigid body to each HES, when the HES and HEJ follow a non-horizontal path.

11. A method of assembling HES and HEJ to form a straight containment, the method comprising:

inserting a first sensory array portion into the containment, the first sensory array portion having sensorized rigid bodies and elongate flexures with arbitrary torsional stiffness, securing the first sensory array portion in the containment to form a bipartite sensor array with unchanging orientation of each sensorized rigid body to each HES, securing the bipartite sensor array in soil or structure, using the contained sensors to read the tilts of the HES, and calculating the shape of the bipartite sensor array from the dimensions of the HES and HEJ, the tilts of the sensorized rigid bodies, and the unchanging orientation of each sensorized rigid body to each HES, when the HES and HEJ follow a non-vertical path.

* * * * *